(12) United States Patent
Bilinski et al.

(10) Patent No.: US 10,438,413 B2
(45) Date of Patent: Oct. 8, 2019

(54) HYBRID 2D/3D DATA IN A VIRTUAL ENVIRONMENT

(71) Applicant: SPAWAR Systems Center Pacific, San Diego, CA (US)

(72) Inventors: Mark Bilinski, Vista, CA (US); Larry Clay Greunke, Lakeside, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 70 days.

(21) Appl. No.: 15/806,125

(22) Filed: Nov. 7, 2017

(65) Prior Publication Data
US 2019/0139306 A1    May 9, 2019

(51) Int. Cl.
| G06T 19/00 | (2011.01) |
| G06T 11/60 | (2006.01) |
| G01S 17/00 | (2006.01) |
| G02B 27/01 | (2006.01) |
| H04N 13/344 | (2018.01) |

(52) U.S. Cl.
CPC ............ *G06T 19/006* (2013.01); *G06T 11/60* (2013.01); *G01S 17/00* (2013.01); *G02B 27/0172* (2013.01); *G06T 2210/04* (2013.01); *H04N 13/344* (2018.05)

(58) Field of Classification Search
CPC ... G06T 19/006; G06T 11/60; G06T 2210/04; H04N 13/344; G01S 17/00; G02B 27/0172
See application file for complete search history.

(56) References Cited

U.S. PATENT DOCUMENTS

| 9,984,499 | B1* | 5/2018 | Jurgenson | G06T 17/00 |
| 2001/0053716 | A1* | 12/2001 | Kubo | A63F 13/10 |
| | | | | 463/43 |
| 2004/0105573 | A1* | 6/2004 | Neumann | G06T 17/00 |
| | | | | 382/103 |
| 2013/0169685 | A1* | 7/2013 | Lynch | G01C 21/3635 |
| | | | | 345/634 |

(Continued)

OTHER PUBLICATIONS

U.S. Appl. No. 62/555,003 (related to US 2019/0075320 A1), Sep. 6, 2017 (Year: 2017).*
Schoenfelder, Ralph et al., "Augmented Reality for Industrial Building Acceptance", IEEE Virtual Reality, Mar. 2008 (Year: 2008).*

(Continued)

*Primary Examiner* — Chante E Harrison
(74) *Attorney, Agent, or Firm* — Naval Information Warfare Center, Pacific; Kyle Eppele; J. Eric Anderson (57) ABSTRACT

A method for using a virtual reality (VR) headset to view a two-dimensional (2D) technical drawing of a physical object of a real-world, real-world environment in three dimensions (3D), the method comprising: using LiDAR to produce a 3D point cloud of the real-world environment; scaling and aligning the 2D technical drawing to match the size and orientation of the physical object as depicted in the 3D point cloud; overlaying the 2D technical drawing (including all labels and dimensions) over the physical object as depicted in the 3D point cloud; and visually comparing the 3D point cloud representation of the physical object to the 2D technical drawing by simultaneously displaying the 3D point cloud of the real-world environment and the overlaid 2D technical drawing to a user with the VR headset.

13 Claims, 6 Drawing Sheets

(56) References Cited

U.S. PATENT DOCUMENTS

| | | | | |
|---|---|---|---|---|
| 2015/0022693 | A1* | 1/2015 | Appia | H04N 5/2355 348/239 |
| 2015/0206343 | A1* | 7/2015 | Mattila | G06T 17/05 345/420 |
| 2016/0026253 | A1* | 1/2016 | Bradski | G02B 27/225 345/8 |
| 2016/0266256 | A1* | 9/2016 | Allen | G01S 17/89 |
| 2017/0127023 | A1* | 5/2017 | High | H04N 13/344 |
| 2017/0220887 | A1* | 8/2017 | Fathi | G06K 9/00201 |
| 2017/0312634 | A1* | 11/2017 | Ledoux | A63F 13/63 |
| 2018/0053347 | A1* | 2/2018 | Fathi | G06T 17/205 |
| 2018/0144547 | A1* | 5/2018 | Shakib | G06T 19/003 |
| 2018/0350044 | A1* | 12/2018 | Ponto | G06T 5/007 |
| 2019/0026956 | A1* | 1/2019 | Gausebeck | G06T 19/20 |
| 2019/0075320 | A1* | 3/2019 | Mammou | H04N 19/597 |
| 2019/0130525 | A1* | 5/2019 | Mou | G06T 3/0031 |

OTHER PUBLICATIONS

McKinnon, Daniel; Autodesk University; RC211948: From Site Scan to InfraWorks 360: Aerial Drone Scans for Planning and Design, Online class screenshot #1.

Rho, Juhee; Autodesk University; CS 10427: Virtual-Augmented Reality for Construction, Utilizing Gear VR, Online class screenshot.

McKinnon, Daniel; Autodesk University; RC211948: From Site Scan to InfraWorks 360: Aerial Drone Scans for Planning and Design, Online class screenshot #2.

DAQRI; DAQRI Smart Helmet Case Study: Mortenson and Autodesk; screenshot of YouTube video (Nov. 2016).

SketchUp; Virtual Design and Construction at Mortenson Construction; screenshot of YouTube video (Mar. 2017).

Trimble Laser Scanning: Laser Scanning As-Built Conditions to Compare to Design Intent; screenshot from website (2016).

Truepoint: Point Cloud with Steel Structure Overlay; YouTube video screenshot.

* cited by examiner

HYBRID 2D/3D DATA IN A VIRTUAL ENVIRONMENT

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 105942.

BACKGROUND OF THE INVENTION

A two-dimensional (2D) drawing package can be used to document the layout of a space. To compensate for lacking one real dimension, a single 2D drawing will only document a subset of the layout information and multiple drawings will be made of the same space. Further, different viewing orientations are often present in a drawing package. As a result, creating these drawing packages and understanding them requires a fair bit of skill. Unfortunately, these drawing packages also have a tendency to be ambiguous, miss some information, and be inconsistent between individual drawings. Generation of such a drawing package often consists of a team or individual with some sort of measuring and recording equipment (e.g. tape measure, laser measure, calipers for the former and notepad, computer for the latter).

Three-dimensional (3D) documentation improves upon the 2D drawing package in that it more naturally represents our 3D world. Classically, one way to generate 3D documentation would be to decipher a 2D drawing package and create a model of the space (computer aided design (CAD) or even a physical to-scale model). Through model-based definitions, a 3D CAD model can be used to generate 2D drawings. More recently, with 3D scanning technologies, it has become possible to scan the space and create documentation directly from the environment. There are a number of technologies which can be used to create 3D scans, such as Light Distance and Ranging (LiDAR), photogrammetry, real-world environment light, and sonar. Depending on the sensor and technique used, they result in point cloud data or triangulated mesh data. In both of these cases, they require additional processing to convert into a 3D CAD model or a 2D drawing package.

When a need to compare point clouds or meshes to 2D documentation arises, it is particularly challenging. Comparing 3D to 3D is natural. And comparing 3D CAD to 2D drawings is straightforward since 3D CAD can generate 2D drawings and the comparison can be made directly 2D to 2D. But with point clouds and meshes, the products aren't immediately comparable.

SUMMARY

Described herein is a method for using a virtual reality (VR) headset to view a 2D technical drawing of a physical object of a real-world environment in 3D, the method comprising the following steps. One step provides for using LiDAR to produce a 3D point cloud of the real-world environment. Another step provides for scaling and aligning the 2D technical drawing to match the size and orientation of the physical object as depicted in the 3D point cloud. Another step provides for overlaying the 2D technical drawing (including all labels and dimensions) over the physical object depicted in the 3D point cloud. Another step provides for visually comparing the 3D point cloud representation of the physical object to the 2D technical drawing by simultaneously displaying the 3D point cloud of the real-world environment and the overlaid 2D technical drawing to a user with the VR headset.

Also described herein is a visualization tool comprising a laser scanner, a computer, means for transferring the scan data to the computer, and a VR headset. The laser scanner is capable of scanning a real-world environment and outputting scan data. The computer is capable of transforming the scan data into a 3D point cloud. The computer is programmed to scale and align an electronic copy of a 2D technical drawing of a physical object to match the size and orientation of a corresponding physical object in the 3D point cloud, and further programmed to overlay the 2D technical drawing (including all labels and dimensions) over the physical object as depicted in the 3D point cloud. The VR headset is communicatively coupled to the computer and configured to simultaneously display the scaled, aligned, and overlaid 2D technical drawing and the 3D point cloud of the real-world environment to a user in an immersive virtual environment.

Also described herein is another embodiment of the method for using the VR headset comprising the following steps. One step provides for scanning the real-world environment to produce scan data. Another step provides for creating with a computer a 3D point cloud of the real-world environment based on the scan data. Another step provides for overlaying the 2D technical drawing (including all labels and dimensions) over the physical object as depicted in the 3D point cloud. Another step provides for visually comparing the 3D point cloud representation of the physical object to the 2D technical drawing by simultaneously displaying the 3D point cloud of the real-world environment and the overlaid 2D technical drawing to a user with the VR headset.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and tools below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
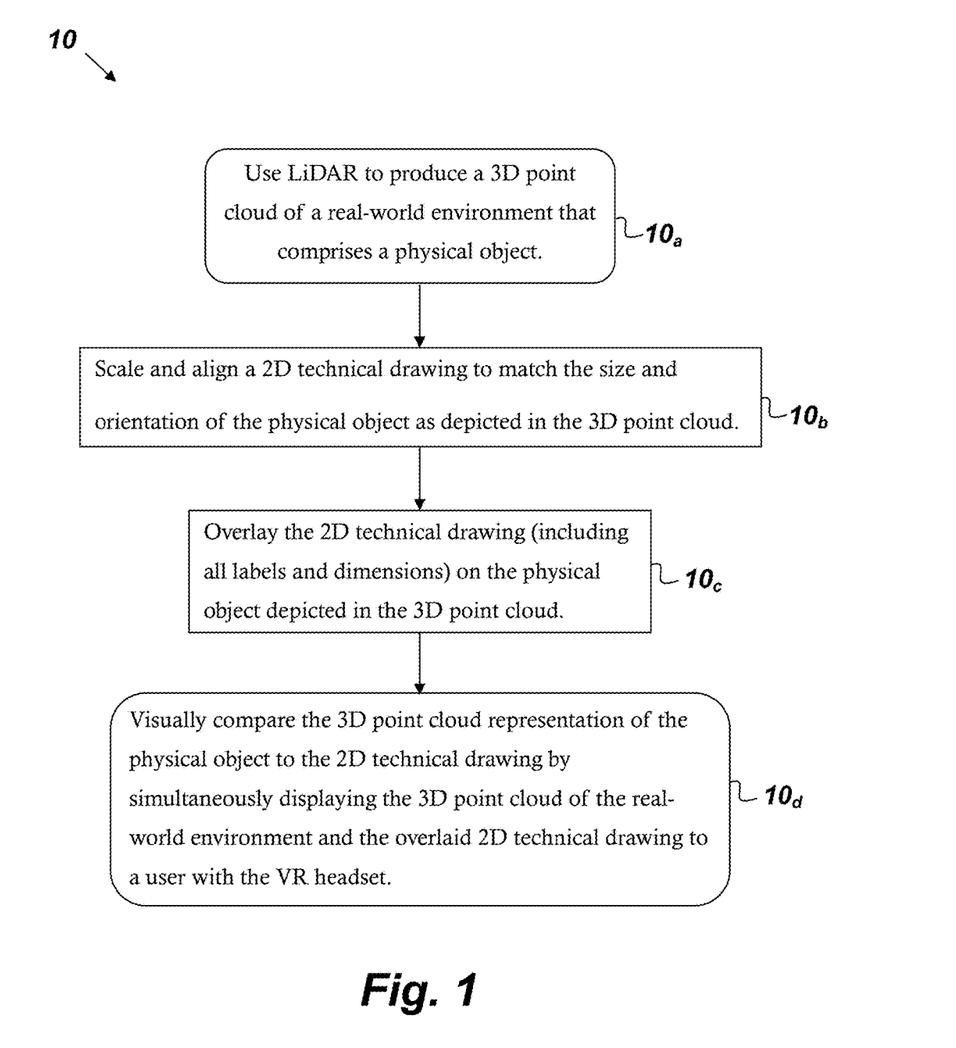
FIG. 1 is a flowchart of a method for using a VR headset to view a 2D technical drawing of a physical object of a real-world environment in 3D.

FIG. 1 is a flowchart of a method 10 for using a VR headset to view a 2D technical drawing of a physical object of a real-world environment in 3D that comprises, consists of, or consists essentially of the following steps. One step $10_a$ provides for using LiDAR to produce a 3D point cloud of the real-world environment. Another step $10_b$ provides for scaling and aligning the 2D technical drawing to match the size and orientation of the physical object as depicted in the 3D point cloud. The physical object can be any real-world structure, device, or article found in a real-world environment. Suitable examples of the physical object include, but are not limited to, a floor, a wall, a ceiling, an appliance, a piece of furniture, and a structural feature. Another step $10_c$ provides for overlaying the 2D technical drawing (including all labels and dimensions) over the physical object depicted in the 3D point cloud. Another step $10_d$ provides for visually comparing the 3D point cloud representation of the physical object to the 2D technical drawing by simultaneously displaying the 3D point cloud of the real-world environment and the overlaid 2D technical drawing to a user with the VR headset.

Method 10 may be used to help organizations/people that still rely heavily on legacy 2D documentation to transition to and adopt 3D documentation of spaces and real-world environments. The simultaneous viewing of both 2D and 3D documentation in a VR headset as provided by method 10 enables users to readily compare the 2D and 3D representations of the same space or real-world environment, thereby enhancing the abilities of users more used to 2D as an intermediate step without having to make the full transition to 3D. Often, 3D scans of a real-world environment are created and 2D technical drawings are made based on the 3D scans. An embodiment of method 10 may be used to compare the 3D point cloud to 2D technical drawings that pre-exist the production of the 3D point cloud. Thus pre-existing 2D technical drawings may be checked to verify that they agree with the as-built condition of the real-world environment as represented by the 3D point cloud.

Figure 2A:
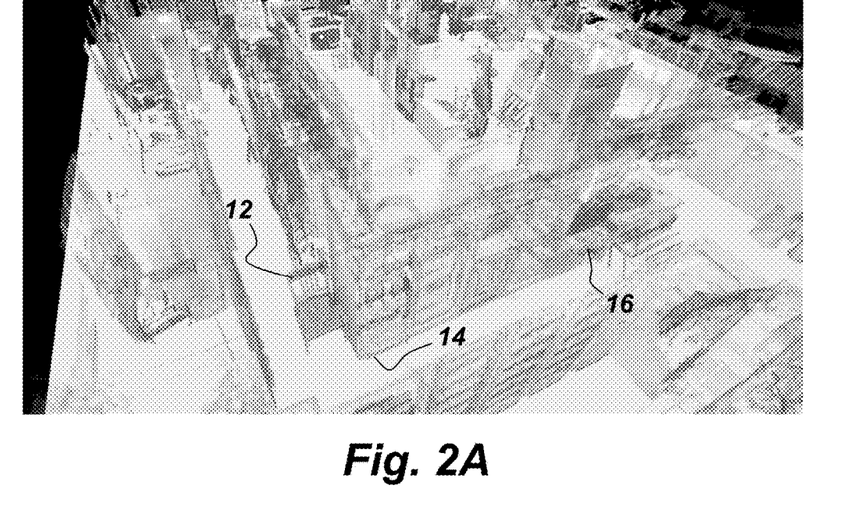
FIG. 2A is an example of a 3D point cloud of a real-world environment.
Figure 2B:
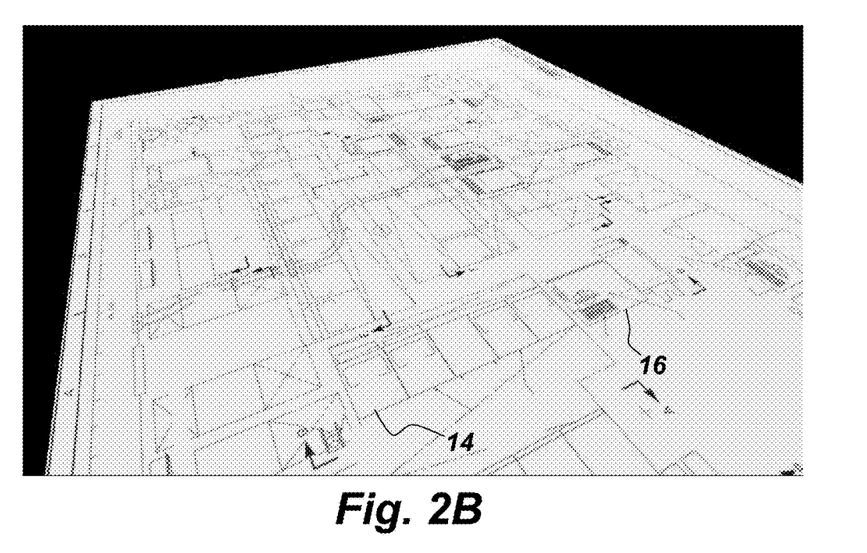
FIG. 2B is a two-dimensional technical drawing of the floor plan of the real-world environment depicted in FIG. 2A.
Figure 3:
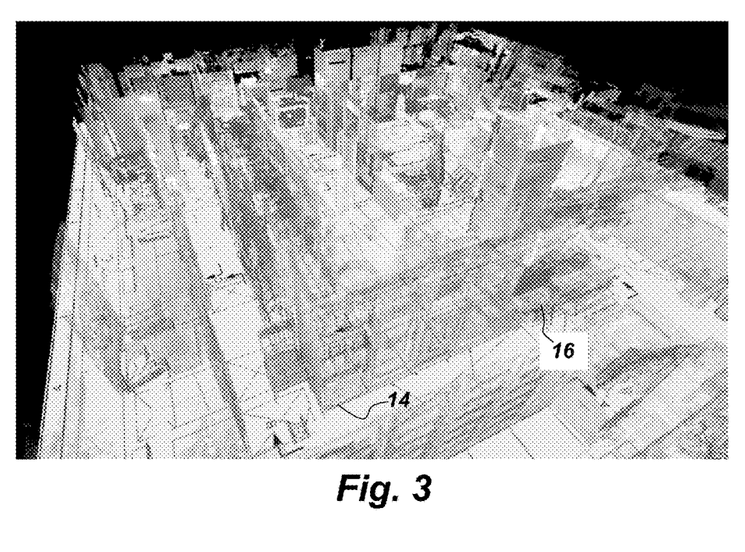
FIG. 3 shows an example hybrid 2D/3D viewing environment where the 2D technical drawing shown in FIG. 2B has been overlaid on the 3D point cloud of the real-world environment shown in FIG. 2A FIGS. 4A and 4B show two different examples of hybrid 2D/3D viewing environments as would be seen by a user with a VR headset.

FIG. 2A is an example of a 3D point cloud of a real-world environment (in this case, a server room). As can be seen in FIG. 2A, the real-world environment is filled with various physical objects, examples of which include, but are not limited to, a chair 12, a cabinet 14, and a desk 16. FIG. 2B is a 2D technical drawing of the floor plan of the same real-world environment depicted in FIG. 2A. Line drawing representations of the cabinet 14 and the desk 16 can also be seen in FIG. 2B. FIG. 3 shows an example hybrid 2D/3D viewing environment where the 2D technical drawing shown in FIG. 2B has been overlaid on the 3D point cloud of the real-world environment shown in FIG. 2A. Note that the 2D technical drawing has been oriented and scaled to match the scale and orientation of the 3D point cloud. The example hybrid 2D/3D viewing environment shown in FIG. 3 is representative of a view a user would have when looking at the example hybrid 2D/3D viewing environment with a VR headset according to method 10. In hybrid 2D/3D viewing environments created according to method 10 (such as is depicted in FIG. 3), the 3D point cloud forms the basis for the virtual environment and the 2D technical drawing is overlaid, to-scale, at the appropriate location in the virtual environment on a 2D surface. For example, with respect to FIG. 3, the 2D floor plan (shown in FIG. 2B) takes the place of, and obscures, the scanned floor in the 3D point cloud.

Figure 4A:
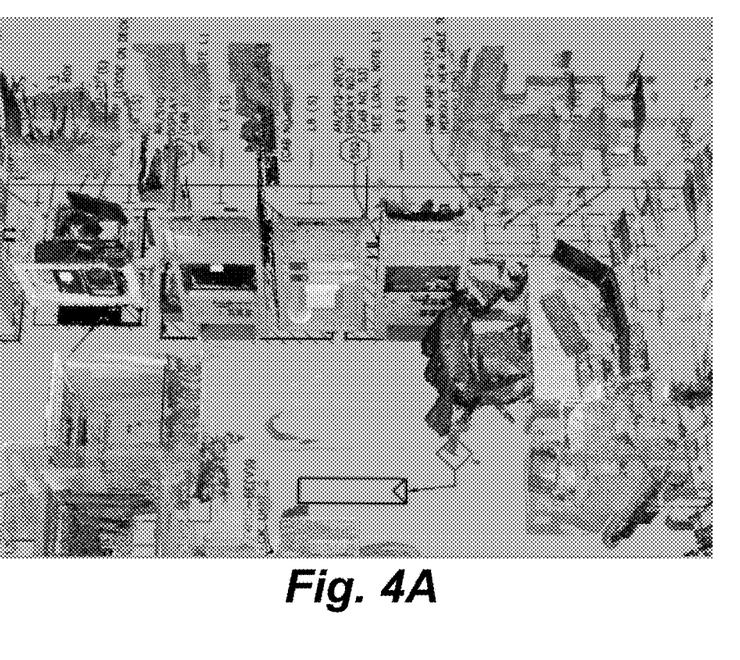
Figure 4B:
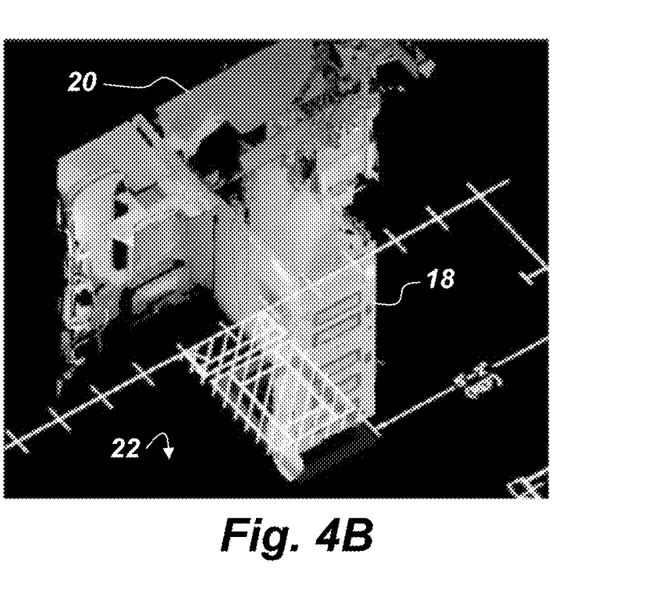
Figure 5:
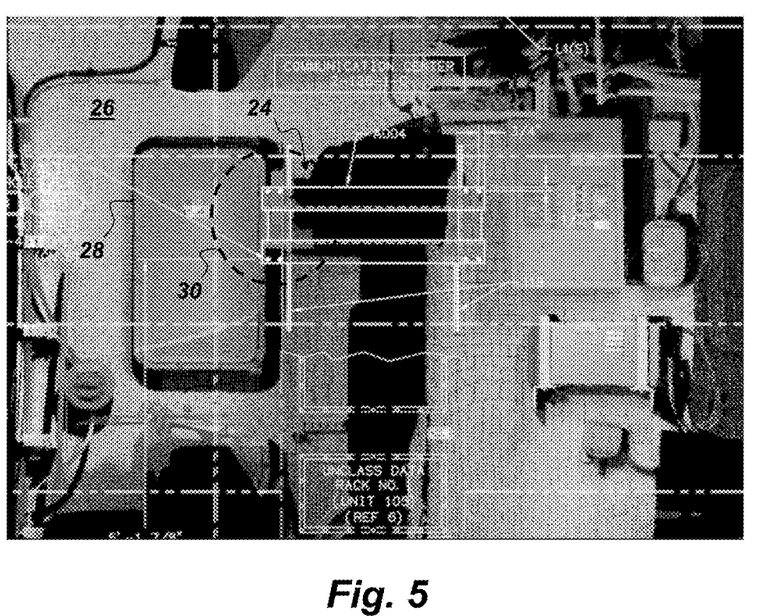
FIG. 5 shows a side profile 2D technical drawing of a planned server rack installation overlaid on the 3D point cloud representation of a wall of a real-world environment.

FIGS. 4A and 4B show two different examples of hybrid 2D/3D viewing environments as may be seen by a user with a VR headset according to method 10. The hybrid 2D/3D viewing environment in FIG. 4A shows a 3D point cloud of a server room with a 2D floor plan overlaying the 3D point cloud representation of the floor in the server room. The hybrid 2D/3D viewing environment in FIG. 4B shows a 3D point cloud of a single server rack 18 and adjacent wall 20, with a 2D floor plan overlaying the floor 22. Some 2D technical drawings show a side view of a given object, so in the hybrid 2D/3D viewing environment, the 2D technical drawing would be displayed on the corresponding side-surface of the object. For example, if the 2D technical drawing shows a wall of given environment, then in the hybrid 2D/3D viewing environment that 2D technical drawing would be displayed on the appropriate wall (such as is shown in FIG. 5). More than one 2D technical drawing may be displayed at the same time in the hybrid 2D/3D viewing environment. For example, one drawing may be overlaid on the floor of the hybrid 2D/3D viewing environment and another drawing may be overlaid on the wall. In method 10, the 2D technical drawing(s) are properly aligned and scaled to the objects to which they correspond in the 3D environment. This allows even a novice user to compare the 2D technical drawing and the 3D point cloud by visual inspection. Virtual reality is a natural method to interact with this 2D/3D hybrid environment.

This method 10 allows visual comparison of 2D and 3D documentation, so it is quick and doesn't require special skill other than navigating the hybrid 2D/3D viewing environment (based on the visualization technique chosen). Virtual reality is the preferred visualization method because then walking can be the navigation technique. Further, you don't have to cycle between two different documents (e.g., looking at one 2D drawing then looking at another) because the overlay lets you look at both simultaneously. Not requiring special skill to interact with the 3D data allows legacy users of 2D data to start interacting with 3D data and gaining those advantages without yet having to fully transition away from 2D technical drawings. At the very least, such visual inspection gives a quick method of verifying whether or not the 2D documentation is accurate and the space is as you expect it to be from the 2D drawing package. Note, due to all the limitations of 2D drawings (some of which are listed in the background), simply confirming a given space is as anticipated is a nontrivial task. And if the given space, or environment, is not as described in the 2D technical drawing, method 10 speeds up the process of identifying the mistakes in the 2D documentation.

FIG. 5 shows a side profile 2D technical drawing of a planned server rack 24 installation overlaid on the 3D point cloud representation of a wall 26 of a real-world environment. The hybrid 2D/3D viewing environment shown in FIG. 5 highlights an example limitation of 2D drawings. In this case, a power panel 28 to the left of the planned rack 24 would have interfered with the installation but was missed in the 2D documentation. The area of potential interference is indicated by the dotted black circle 30 in FIG. 5. When the 2D technical drawing of the planned server rack 24 is overlaid on the 3D point cloud data of the wall 26, the shortcoming of the 2D technical drawing can be quickly identified visually. In the embodiment of the hybrid 2D/3D viewing environment shown in FIG. 5, the background of the 2D technical drawing of the planned server rack 24 has been removed leaving only lines, labels, and dimensions to facilitate viewing of the wall 26 and the other objects on the wall 26 such as the power panel 28.

As can be seen in FIG. 5, method 10 allows for quick comparison between 2D drawings and 3D point cloud data, which was not readily possible before. Since this form of 3D data is "raw" scan data, it makes 3D documentation from that pipeline more useful earlier in the pipeline. The 3D/2D hybrid environment can be created by placing the 2D drawings on any appropriate 2D surface within the 3D environment. Natural examples would be floors, walls, and ceilings of a 3D environment, which correspond to floor plans, side views, and reflected ceiling plans respectively. Method 10 may also be practiced with less obvious 2D surfaces, like the surfaces of objects within the space. For example one can overlay 2D schematics of a refrigerator directly on the appropriate sides of the refrigerator as represented by the 3D point cloud in the hybrid 2D/3D environment.

The virtual reality environment may be navigated by a user with the aid of a keyboard, mouse, joystick, eye-tracking, walking, controller, or any other control mechanism used in navigating virtual environments (such as video games). The preferred method of interaction is virtual reality with walking, as that is the most natural analogue to inspecting the real space in person.

The following steps illustrate on example of how to construct the 3D point cloud of the real-world environment. First scan to exported data by scanning the real-world environment using a LiDAR laser scanner to produce scan data. The scanning of the real-world environment may be performed in darkness to help avoid artifacts in the scan data that result from movement of people through the area being scanned. Data from the scanner can be transferred to a computer with any data transfer means, such as a secure digital (SD) card. One may use commercially-available processing software to stitch data from multiple scans together to create a data-intensive point cloud, a process known as registration. The registration process can involve a combination of techniques that are algorithmic and manual. The algorithmic techniques can look for 3d physical objects, top down 2d physical objects, or overall error minimization for cloud to cloud comparison. Manual techniques involve common geometry selection and or manual rotation, translation. The cloud to cloud error minimization is usually a last step to really lock things in place whereas other techniques get things roughly in place first.

Once registered, the data-intensive 3D point cloud is degraded to a more manageable size by reducing the number of data points in the data-intensive point cloud to create a degraded point cloud. This may be done by selecting a smaller box of space and discarding points outside that area of interest. (Bounding box). Then often the point density is still incredibly high and can be further degraded. There are a number of subsampling techniques available, including just randomly picking only an acceptable number of points. A suitable example of a subsampling technique is an octree filter, in which one subdivides the space and only picks one point from each subdivision. In areas of high density one loses many points, but in areas of low density one loses potentially nothing. The end result is a uniform density point cloud. When sufficiently degraded, the degraded point cloud may be imported into gaming software where the 2D drawings may be overlaid and the hybrid 2D/3D environment may be viewed. The degraded 3D point cloud may be exported to a game-engine-compatible format, such as ASCII txt or PLY format.

For example, the degraded 3D point cloud may be formatted in ASCII text and imported into a commercially-available software framework used for creating and developing video games (also referred to herein as a game engine, or gaming software). One may use an add-on that imports point clouds in a specific text format. Because game engines are not designed around point clouds this is a workaround method and isn't capable of handling more than a couple million points in the 3D point cloud. Once imported, the degraded 3D point cloud is treated as a collection of assets that then can be visualized or interacted with. The collection is a result of how the import works and is a result of the limit to the size of individual meshes.

In order to overlay a 2D floorplan over a 3D point cloud, one would need a camera (VR) for the user's visualization and a plane on which they walk (as opposed to fall indefinitely). The plan may be textured with the 2D floor plan, so now instead of just being a floor, it looks like the drawing. The last step then is to align or register the visualization of the 2D drawing with the 3D point cloud. The 2D drawing may be manually stretched, rotated, and shifted until it appears to a user that objects depicted in the drawing and the 3D point cloud are aligned. There are more rigorous approaches that could be used however, such as point picking, or 2D physical object detection from a top down perspective, in either case minimizing the error from aligning common physical objects. Once the 3D point cloud and 2D technical drawing(s) is/are aligned the hybrid 2D/3D viewing environment is constructed.

Figure 6:
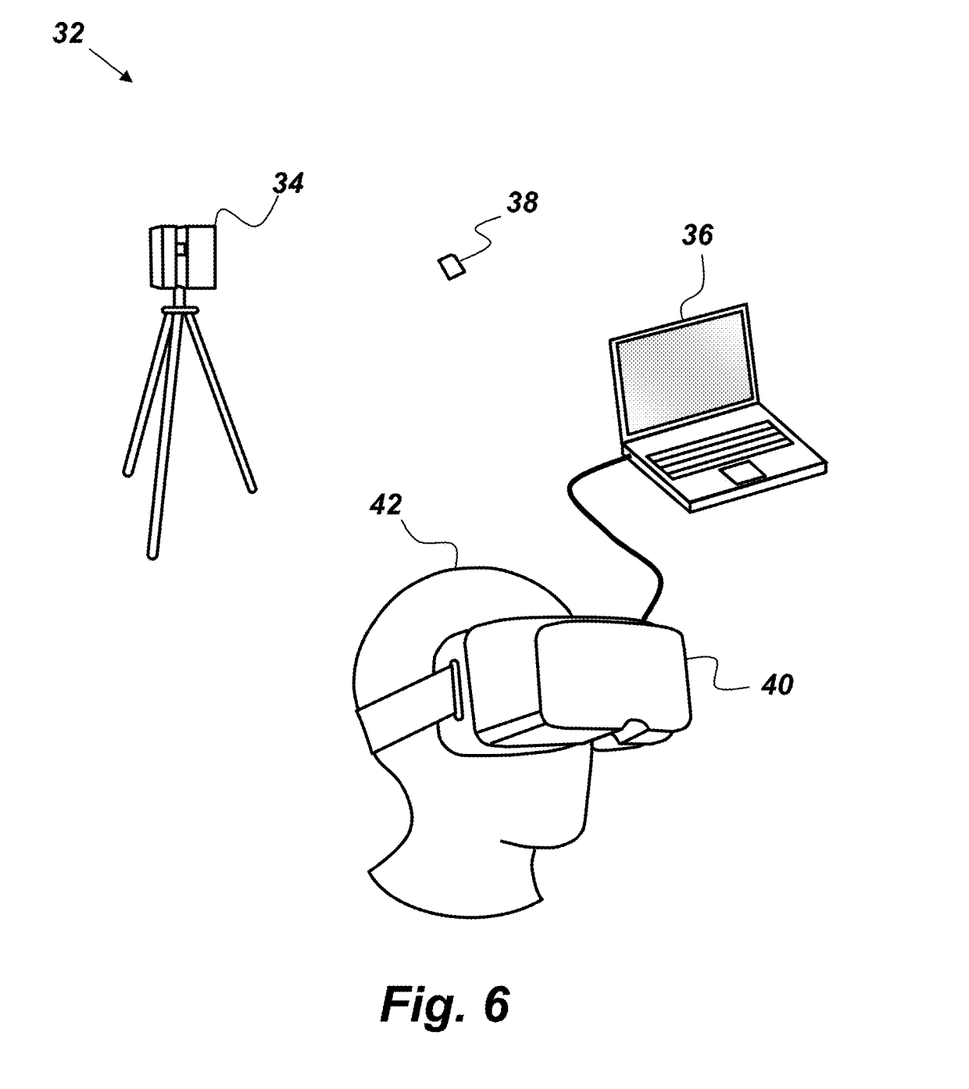
FIG. 6 is an illustration of a hybrid 2D/3D viewing environment visualization tool.

FIG. 6 is an illustration of a hybrid 2D/3D viewing environment visualization tool 32, which comprises, consists of, or consists essentially of a laser scanner 34, a computer 36, means 38 for transferring scan data, and a VR headset 40. The laser scanner 34 must be capable of scanning a real-world environment and outputting scan data. The computer 36 must be capable of transforming the scan data into the 3D point cloud. The computer 36 is also programmed to scale and align an electronic copy of a 2D technical drawing of a physical object to match the size and orientation of a corresponding physical object depicted in the 3D point cloud. The computer 36 is further programmed to overlay the 2D technical drawing (including all labels and dimensions) on the physical object as depicted in the 3D point cloud. The means 38 for transferring the scan data to the computer may be an SD card, a cable, a wireless transmitter, a flash memory storage device such as a universal serial bus (USB) drive, a compact disc, or other commercially-available data transfer mediums. The VR headset 40 is communicatively coupled to the computer 36 and configured to simultaneously display the scaled, aligned, and overlaid 2D technical drawing and the 3D point cloud of the real-world environment to a user 42 in an immersive virtual environment.

From the above description of method 10 and visualization tool 32 for using a VR headset to view a 2D technical drawing of a physical object of a real-world environment in 3D, it is manifest that various techniques may be used for implementing the concepts of method 10 and tool 32 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 and visualization tool 32 are not limited to the particular embodiments described herein, but are capable of many embodiments without departing from the scope of the claims.

We claim:

1. A method for using a virtual reality (VR) headset to view a two-dimensional (2D) technical drawing of a real-world, physical object in three dimensions (3D), the method comprising:
   using LiDAR to produce a 3D point cloud of a real-world environment that comprises the physical object by performing the following substeps:
      scanning the real-world environment with a laser scanner to produce scan data;
      registering the scan data with a computer to stitch data from multiple scans together to create a data-intensive point cloud;
      degrading the data-intensive point cloud by reducing the number of data points in the data-intensive point cloud to create a degraded point cloud by using an octree filter to subdivide the data-intensive point cloud and preserving only one point from each nonempty subdivision;
      creating the 3D point cloud by formatting the degraded point cloud into a game-engine-compatible format; and
      importing the 3D point cloud into a software framework used for creating and developing video games;
   scaling and aligning the 2D technical drawing to match the size and orientation of the physical object as depicted in the 3D point cloud;
   overlaying the 2D technical drawing (including all labels and dimensions) on the physical object depicted in the 3D point cloud; and
   visually comparing the 3D point cloud representation of the physical object to the 2D technical drawing by simultaneously displaying the 3D point cloud of the real-world environment and the overlaid 2D technical drawing to a user with the VR headset.

2. The method of claim 1, wherein the game-engine-compatible format is ASCII.

3. The method of claim 1, wherein the game-engine-compatible format is polygonal file format (PLY).

4. The method of claim 1, wherein the degraded point cloud comprises fewer than two million data points.

5. The method of claim 1, further comprising removing a background from the 2D technical drawing leaving only lines, labels, and dimensions such that when the 3D point cloud of the real-world environment and the overlaid 2D technical drawing are simultaneously displayed to the user with the VR headset the user only sees the lines, labels, and dimensions of the 2D technical drawing overlaid on the physical object as depicted in the 3D point cloud.

6. The method of claim 1, wherein when the 3D point cloud of the real-world environment and the overlaid 2D technical drawing are simultaneously displayed to the user with the VR headset the physical object as depicted in the 3D point cloud is obscured from the view of the user by the overlaid 2D technical drawing.

7. The method of claim 1, wherein the physical object is a floor and the 2D technical drawing is a floor plan.

8. The method of claim 1, wherein the physical object is a wall.

9. The method of claim 1, wherein the 2D technical drawing pre-exists the production of the 3D point cloud.

10. A method for using a virtual reality (VR) headset to view a two-dimensional (2D) technical drawing of a real-world physical object in three dimensions (3D), the method comprising:
   scanning a real-world environment that comprises the physical object to produce scan data;
   creating with a computer a 3D point cloud of the real-world environment based on the scan data comprising the substeps of:
      registering the scan data with the computer such that scan data from multiple scans are stitched together to create a data-intensive point cloud;
      degrading the data-intensive point cloud by reducing the number of data points in the data-intensive point cloud to create a degraded point cloud by using an octree filter to subdivide the data-intensive point cloud and preserving only one point from each nonempty subdivision;
      creating the 3D point cloud by formatting the degraded point cloud into a game-engine-compatible format; and
      importing the 3D point cloud into a software framework used for creating and developing video games;
   overlaying the 2D technical drawing (including all lines, labels, and dimensions) on the physical object as depicted in the 3D point cloud; and
   visually comparing the 3D point cloud representation of the physical object to the 2D technical drawing by simultaneously displaying the 3D point cloud of the real-world environment and the overlaid 2D technical drawing to a user with the VR headset.

11. The method of claim 10, wherein prior to the overlaying step, the 2D technical drawing is scaled and aligned to match the size and orientation of the physical object as depicted in the 3D point cloud.

12. The method of claim 11, wherein the scanning step is performed with a LiDAR laser scanner.

13. The method of claim 10, wherein a background of the overlaid 2D technical drawing is sufficiently transparent such that when the 3D point cloud of the real-world environment and the overlaid 2D technical drawing are simultaneously displayed to the user with the VR headset the lines, labels, and dimensions of the overlaid 2D technical drawing as well as the physical object as depicted in the 3D point cloud are visible to the user in the VR headset.

* * * * *